Dec. 13, 1932.  M. B. BECK ET AL  1,891,136
STREET ILLUMINATION
Original Filed June 25, 1931   5 Sheets-Sheet 1

INVENTORS
Morris B. Beck
BY John D. Whittaker
William S. Glueck
ATTORNEY

Dec. 13, 1932.    M. B. BECK ET AL    1,891,136
STREET ILLUMINATION
Original Filed June 25, 1931    5 Sheets-Sheet 2
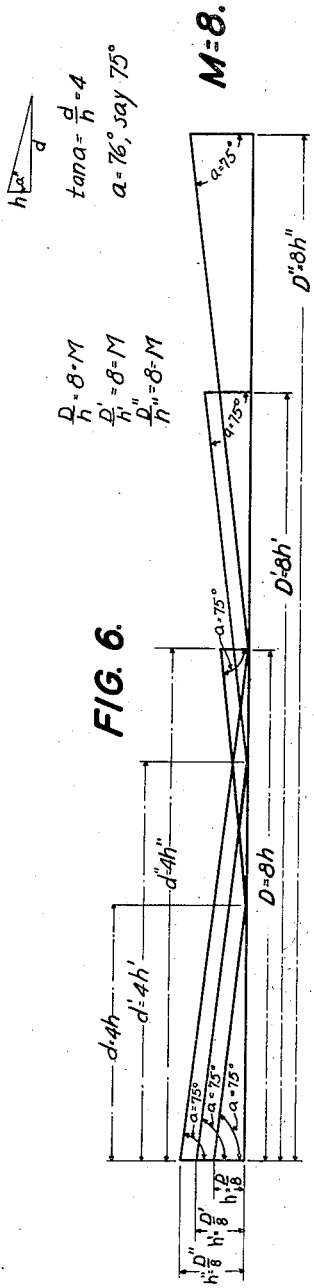
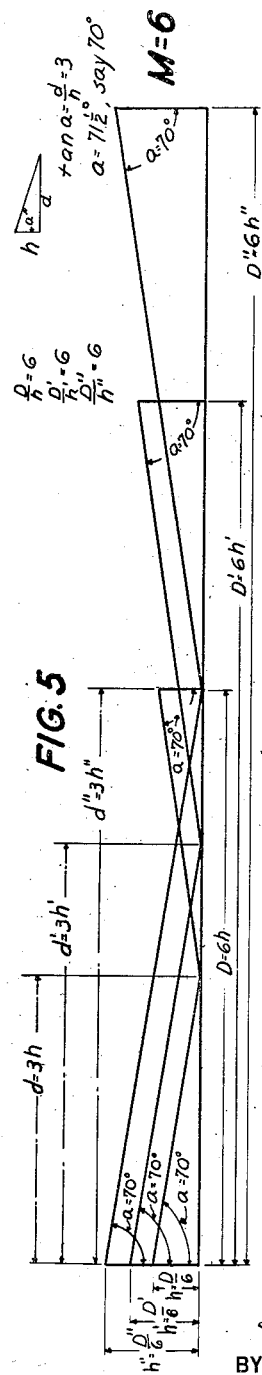
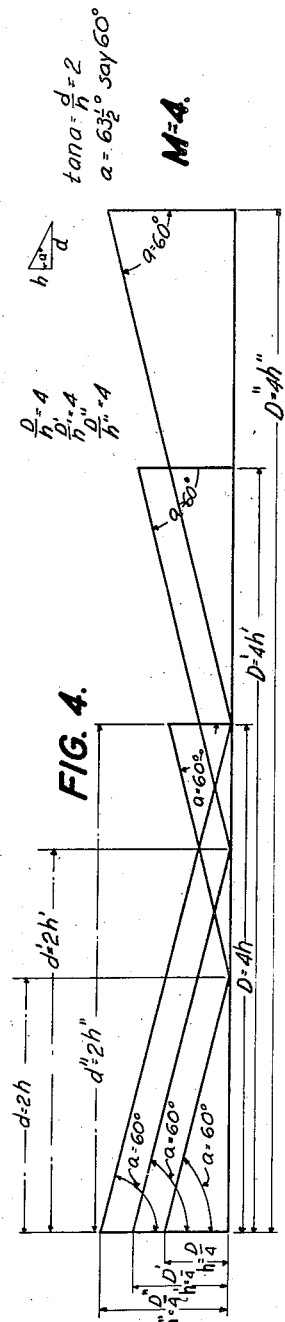
INVENTORS
Morris B. Beck
BY John D. Whittaker
William S. Gluck
ATTORNEY Dec. 13, 1932.  M. B. BECK ET AL  1,891,136
STREET ILLUMINATION
Original Filed June 25, 1931  5 Sheets-Sheet 3

RESULTS PRODUCED BY OUR PROCESS
RESULTS PRODUCED BY REFRACTION

INVENTORS
Morris B. Beck
BY John O. Whittaker
William B. Glover
ATTORNEY

Dec. 13, 1932.  M. B. BECK ET AL  1,891,136
STREET ILLUMINATION
Original Filed June 25, 1931  5 Sheets-Sheet 4

INVENTORS
Morris B. Beck
BY John D. Whittaker
William L. Glaves
ATTORNEY

Dec. 13, 1932. M. B. BECK ET AL 1,891,136
STREET ILLUMINATION
Original Filed June 25, 1931 5 Sheets-Sheet 5

INVENTOR
Morris B. Beck
BY John D. Whittaker
William S. Gluck
ATTORNEY

Patented Dec. 13, 1932

1,891,136

UNITED STATES PATENT OFFICE

MORRIS B. BECK, OF NEW YORK, AND JOHN D. WHITTAKER, OF BABYLON, NEW YORK, ASSIGNORS TO WELSBACH STREET LIGHTING COMPANY OF AMERICA, OF PHILADELPHIA, PENNSYLVANIA, A CORPORATION OF DELAWARE

STREET ILLUMINATION

Substitute for application Serial No. 546,904, filed June 25, 1931. This application filed October 4, 1932. Serial No. 636,239.

This application is to take the place of application Serial No. 546,904, filed on June 25, 1931.

Our invention relates to planned scientific street lighting. It is well known that "the flux from any light source naturally radiates in all directions". "Consider what happens when bare lamps are used to light the street. Half of all the light is wasted upward. That leaves 50% below the horizontal but even this 50% is partly wasted because too much of it shines on the lawns and houses outside of the street so that usually less than 25% actually reaches the street.

Even this small percentage is not used correctly because it produces on a street a series of bright spots and dark areas so that vision is difficult; the eye is constantly trying to adjust itself, first to one then to another intensity. The light is ineffective because it is not properly distributed."

It has been shown by scientific analysis and practical observations concerning seeing in daylight, that the ideal objective to be striven for in the planning and installation of the lighting systems for street illumination, in substantially uniform, horizontal illumination on the street surface.

It is therefore conceded by illuminating engineers that "one of the most important requirements of street lighting is a uniform intensity upon the road way and side walks so that pedestrians and drivers may proceed in safety and comfort. Uniform intensity may be obtained either by close spacing of the units or by controlling the light. Light may be controlled by reflection or refraction".

"If diffusing globes are used, the distribution of the light is not improved. Diffusing globes do not redirect light. They merely scatter it in all directions. True they make the light more pleasing to look at, but they do not improve the illumination. Metal reflectors are sometimes used and they prevent some of the waste of upward light but they do not prevent the waste of light outside the street area and they do not prevent the spotty effect of alternating light and dark areas."

"Reflection is the method generally adopted in interior lighting, but in street lighting where light sources must be spaced at wider intervals, reflectors would produce the condition of spotty illumination or of glare."

This last statement has been the claim of street lighting engineers up to the time of our invention.

Accuracy of the following statement has also been conceded before our invention.

"Refraction, which is the bending of a ray of light as it passes from one medium to another medium of different density, is universally used for the directional control of light for street illumination."

Another claim of the same nature is to the effect that

"It is impossible with ordinary reflectors and globes to distribute the light even approximately as shown to be desirable by the ideal curves".

Mathematical calculations have been made to derive the correct shapes of the prototype curves of light-distribution to be emitted by street lighting units for the accomplishment of uniform horizontal illumination to streets under all variations of the relation of the spacing distances to mounting heights of the lighting units. By means of these formulæ, thus deduced, the accurate form, or forms, of the ideal prototype curves of distribution for effective street illumination by means of practical street-lighting systems can be prescribed.

It concededly follows from the above analysis that "it must be possible to see objects by illumination effect if the purposes for which street lighting is to be provided are to be at all adequately met. From this it logically follows that the ideal to be aimed at, is to uniformly light the street throughout its entire length, so that objects can be equally well seen at all points along the street by the light which falls on them. This is known as illumination effect."

"If it is aimed to provide conditions for the discernment by illumination effect, of objects at any point along the street uniform illumination inevitably becomes the ideal of street lighting practice."

In the pursuit of ideal street lighting on a scientific basis, giving due consideration to the above analysis of adequate street lighting requirements, it is necessary to determine the ideal light-distribution curves which are utilizable for uniform lighting on the street surfaces for given ratios of spacing distances to mounting heights. Such ideal light distribution curves are called prototype curves.

"Prototype curves for discernment by illuminating effect will therefore be the family of curves which will produce uniform illumination under the varying conditions of spacing distance and mounting height."

"Any given curve of light distribution will give the same results as to uniformity of horizontal illumination upon the street surface, no matter what the mounting height or spacing, if the relation between these two elements is kept constant."

"Uniformity,—that is, the relation of maximum to minimum illumination,—will remain constant so long as the ratio between lamp separations and mounting heights remains constant. It follows, therefore, that if the prototype light-distribution curve of uniform horizontal illumination be derived that any ratio between lamp separations and mounting heights, for such prototype curve will apply, whatever the actual separations and mounting heights, so long as the ratio of these two quantities remains constant."

This ratio has been called M. In other words $$M = \frac{\text{distance between adjacent light units}}{\text{height of light unit above street}}.$$

In order to more clearly show the state of the art and to indicate the great need for our process, in the illuminating industry, and its place in the street-lighting art, we have quoted herein extensively from accepted statements by well known authorities on the subject of illuminating engineering.

While the desirability of the aforesaid prototype curve of light-distribution for the production of uniform horizontal illumination in street-lighting has been admitted by illuminating engineers for years to be the ideal for which to strive, its practical adoption by the public to any considerable degree in street lighting in America has been greatly deterred and delayed by the large expense involved by the use of the necessary accessories and equipment to transform and reshape the bare lamp-distribution by means of refracting glassware, the only type able to accomplish this object before our invention. This excessive expense consists of three factors—(1) increased investment, due to relatively high cost of glassware and accessories; (2) high maintenance cost due to replacement of broken glassware and accessories, outer enclosing globes broken by falling pieces of glassware inside the luminaries, and the cleaning and adjusting the equipment; and (3) the loss of efficiency necessarily involved through the absorption of light by refraction, resulting in relatively low over-all efficiencies of such refracting units.

These were the conditions in the art which confronted us before we made our invention, the objects of which are to produce a process which, if followed, eliminates or minimizes, the aforesaid objections.

A further object of our invention is to produce a process, which, if followed, will permit the attainment of very much lower investment and maintenance costs.

A further object is the attainment of very much higher efficiencies by entirely eliminating all outside reflecting and refracting accessories and their consequent expense and losses.

We have demonstrated in actual practice that over-all efficiencies, that is the ratio of the total lumens emitted by a bare street lamp to the total light output of a street lamp constructed in accordance with our process, as high as 93% can be attained in the transformation of the bare lamp-distribution into the ideal.

A further object is to attain the foregoing and yet, by following our process, produce an electric light bulb, usable in scientific street lighting and which is applicable to all standard types of street lighting equipments.

A further object of our invention is to provide a process which, if followed, will result in the production of an electric street lighting bulb in which the adjustment of the light directing media, necessary to approximate the predetermined ideal light-distribution, is permanent.

A further object of our invention is to produce a process which, if followed, will result in simplified lower-cost maintenance of street lighting systems, due to the elimination of the cleaning and adjusting of all auxiliary glassware and accessories exterior to the electric street lighting bulb; eliminating of the handling, delivering and stocking of such relatively heavy and fragile equipment, and the saving of rental for, and maintenance of, the storage spaces, for such equipment.

A still further object of our invention is to produce a process, which, if followed, will eliminate the lack of permanency of the adjustment of auxiliary glassware and accessories, with the consequence that the reliability and quality of the illumination results are increased.

A still further object of our invention is to produce a process which, if followed in the construction and operation of planned scientific street-lighting systems, will realize the savings, economies and advantages of all of the above set forth objects.

For the purpose of deriving the ideal light-distribution curves for uniform horizontal street illumination, we have used the well known formulæ (1) and (2), given below:

*Formulæ*

When $a$ is less than $\tan^{-1}\frac{M}{2}$ ...

$$(cp.)\ a = K\frac{1 + \sin\ \cos^{-1}\frac{\tan a}{\frac{1}{2}M}}{\cos^3 a}$$

When $a$ is greater than $\tan^{-1}\frac{M}{2}$ ...

$$(cp.)\ a = K\frac{1 - \sin\ \cos^{-1}\frac{M - \tan a}{\frac{1}{2}M}}{\cos^3 a}$$

It is possible for one sufficiently versed in mathematics by means of these formulæ, to ascertain by the accompanying specifications, how such curves are constructed, reference being made to the accompanying drawings.

We shall proceed to describe the process by which we are able, as demonstrated in actual street lighting practice, to accomplish the objects herein set forth.

Referring specifically to the drawings:

Figure 4 is a diagram showing the relation of varying spacing distances to mounting heights for the values of M corresponding to Figure 1;

Figure 5 is a diagram showing the relation of varying spacing distances to mounting heights for the values of M corresponding to Figure 2;

Figure 6 is a diagram showing the relation of varying spacing distances to mounting heights for the values of M corresponding to Figure 3;

Figure 8:
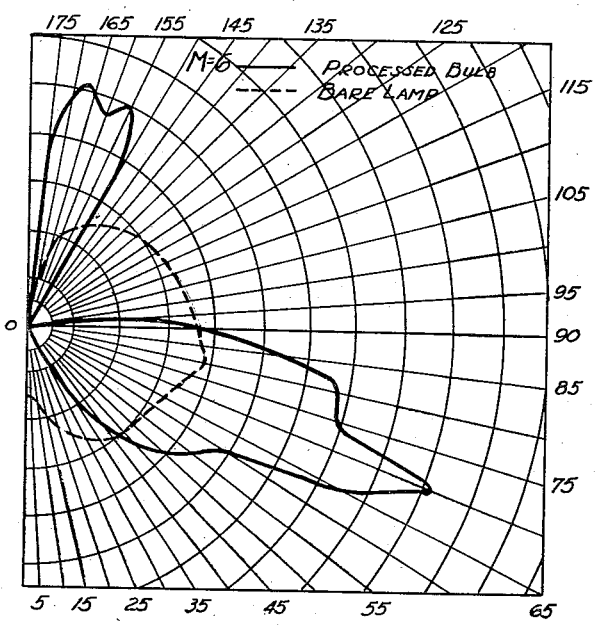

Figure 8 is a comparison of a light-distribution curve actually attained in practice from a street lighting unit constructed in accordance with our process with the light-distribution curve, delivered by the same gas-filled, tungsten-filament, incandescent, series street-lamp, before it was processed. In this instance the lamp is processed so as to deliver a small amount of lumens upwardly to be utilized in any desired manner, such as illuminating the upper portion of an outer enclosing globe, etc.

Figure 1:
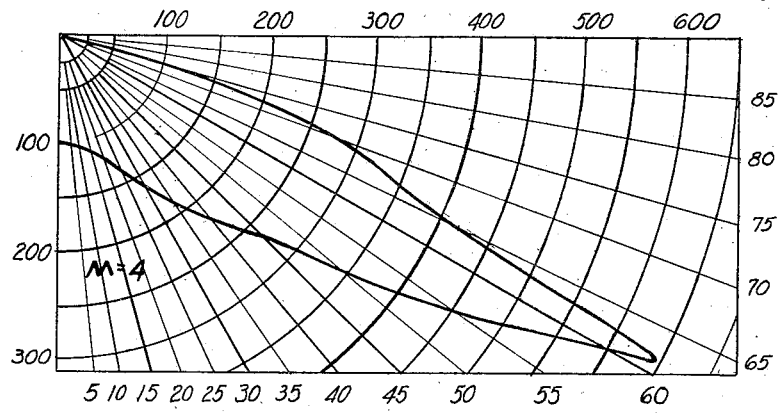
Figure 1 is a diagram of the ideal prototype curve for street lighting where $M=4$.
Figure 2:
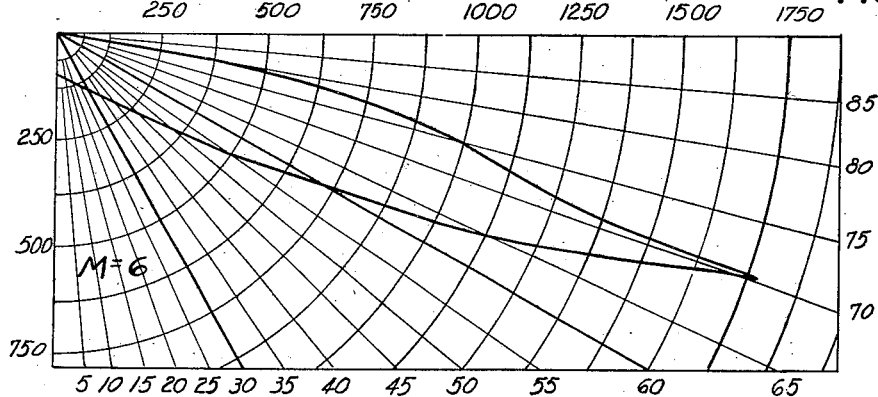
Figure 2 is a diagram of the ideal prototype curve for street lighting where $M=6$.
Figure 3:
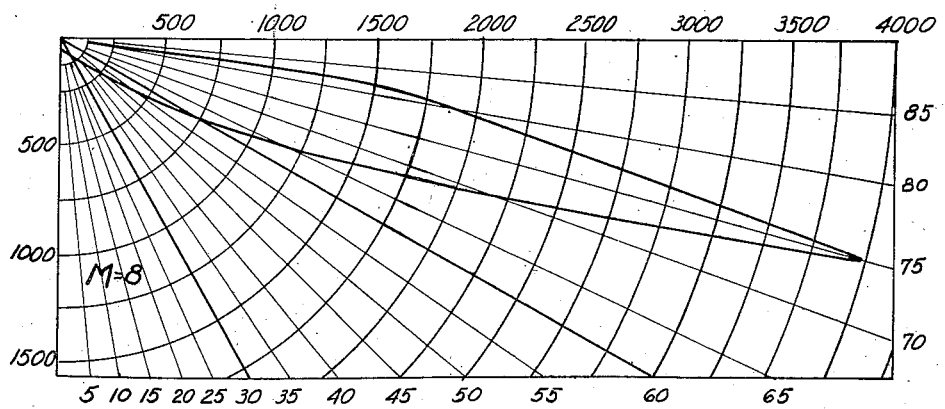
Figure 3 is a diagram of the ideal prototype curve for street lighting where $M=8$.
Figures 7, 9:
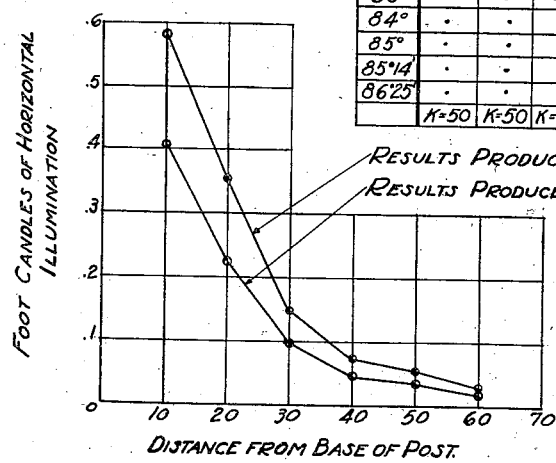
Figure 7 is a tabulation of prototype curve, candle-power values when various values of M are substituted in formulæ (1) and (2)
Figure 10:
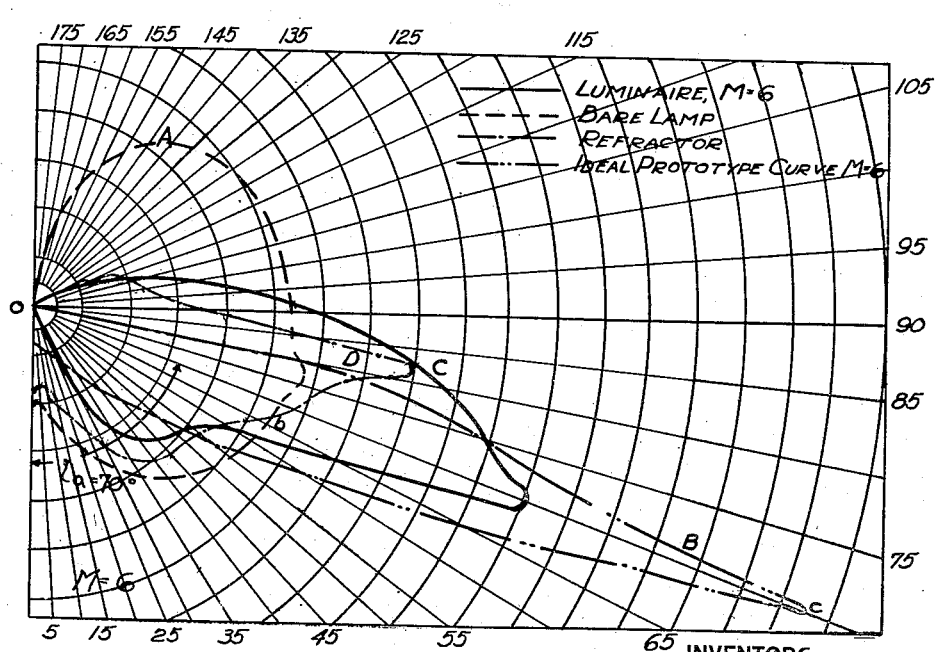

Figure 9 is a graph showing results obtained in an actual street lighting installation, utilizing a street lighting unit, constructed in accordance with our process, in comparison with a street lighting unit constructed by an exponent of the handling of light by refraction as hereinbefore outlined;

Figure 10 is a comparison of the light-distribution curves of a bare lamp, a street lighting unit constructed in accordance with our process, and the ideal shape of prototype curve for $M=6$, together with a distribution curve from a street lighting unit actually constructed by an exponent of the handling of light by refraction as hereinbefore outlined.

Figure 13:
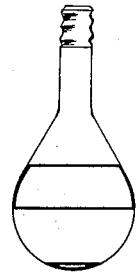
Figure 11:
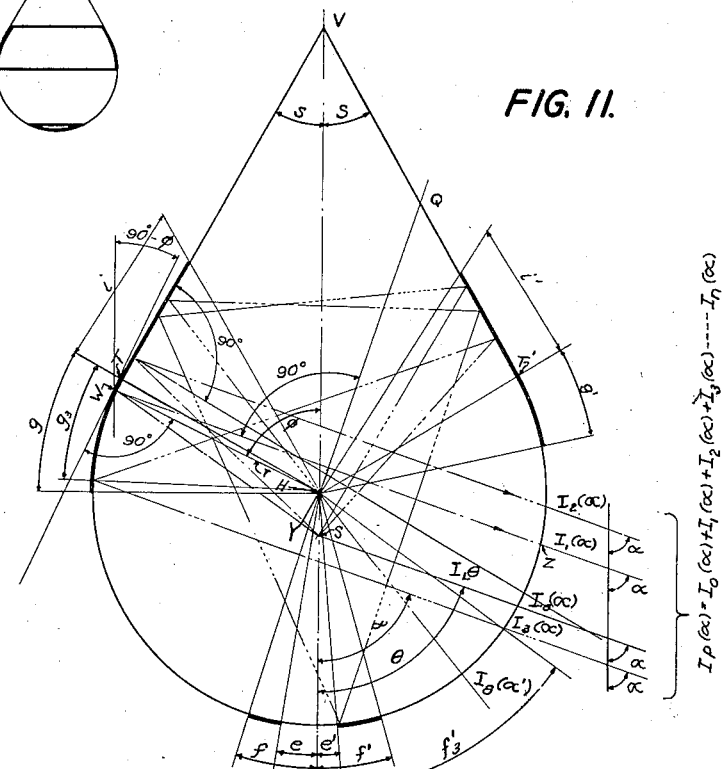
Figure 12:
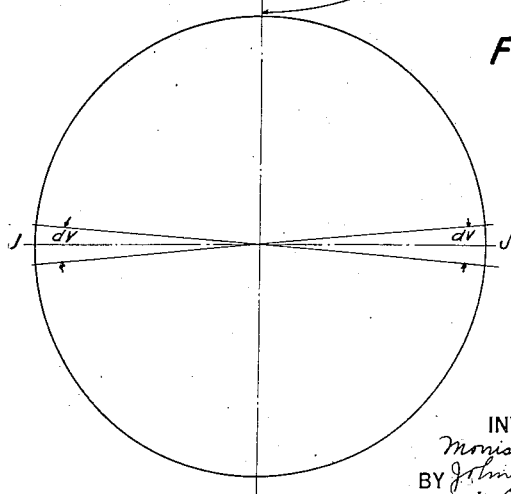

Figure 11 is a diagram for the location of light rays emitted from a point source and showing in any differential vertical angle formed by two planes intersecting along the axis of the bulb;

Figure 12 is a diagram representing a sectional plane taken in said differential vertical angle; and Figure 13 is a side elevation of a bulb having its outer surface processed in accordance with our invention.

All light-distribution curves shown herein give 0° to 180° readings only, in the customary manner.

In referring to the drawings and graphs, a series of symbols will be employed, a tabulation and description of which will now be given.

$a$ = angular direction of a ray of light measured from the nadir or point directly below the lamp. This represents the Greek symbol alpha.

$cp$ = candlepower of a light emitted from a street lighting unit in a direction along the angle $a$.

$K$ = a constant governing the amount of flux included within the prototype curve.

$$M = \frac{\text{distance between adjacent light units}}{\text{height of light unit above street}}.$$

$h, h', h''$ = various heights of the street-lighting units.

$D, D', D''$ = various spacing distances corresponding to the above mounting heights.

$d, d', d''$ = various distances from base of post to mid-points between units.

In any selected axial plane through the bulb, such as JJ, Figure 11, $I_L(\theta)$ represents the light intensity of bare lamp at angle $\theta$;

$I_p(a)$ represents the light intensity of prototype curve at angle $(a)$;

$I_0(a)$ represents the light intensity of processed lamp at angle $(a)$ due to unreflected light;

$I_1(a)$ represents the light intensity of processed lamp at angle $(a)$ due to the light that is reflected once from the spherical surface $g$, or $g'$ Figure 11, and emerges at angle $(a)$ through the spherical portion of the bulb;

$I_2(a)$ represents the light intensity of processed lamp at angle $(a)$ due to the light that is reflected once from the conical surface $i$, or $i'$, Figure 11, and emerges at angle $(a)$ through the spherical portion of the bulb;

$I_3(a)$ represents the light intensity of the processed lamp at angle $(a)$ due to the light that is reflected once from the conical surface $i$, or $i'$, Figure 11, and then once from the spherical surface $g$, or $g'$, Figure 11, and emerges through the spherical portion of the bulb;

$I_8(a')$ represents the light intensity of the processed lamp at angle $(a')$ due to the light that is reflected once from the conical surface $i'$, then from the conical surface $i$, then from the lower spherical surface $f'$, then from the conical surface $i'$, then from the conical surface $i$, all in Figure 11, and emerges through the lower spherical portion of the bulb at an angle $(a')$ which is not equal to the angle $(a)$;

The parameters of the lamp and other symbols used are as follows:

On the left side of Figure 11, $e$ is the angular spread, from the nadir, of a transparent portion of the bottom of the spherical portion of the bulb;

$f$ is the angular spread of the opaque specular reflective medium on the lower spherical portion of the bulb, when $e=0$, i. e., when said portion is completely covered;

$f-e$ is the angular spread of the opaque specular reflective medium on the lower spherical portion of the bulb, when $e$ is greater than 0, i. e. when a transparent portion of the lower spherical part of the bulb exists.

$i$ is the angular spread of the opaque specular reflective medium on the conical portion of the bulb;

$g$ is the angular spread of the opaque specular reflective medium on the upper spherical portion of the bulb;

$g_3$ is an angular spread of the opaque specular reflective medium on the upper spherical portion of the bulb which is greater than 0 and less than $g$;

$T$ is the point of tangency of the conical portion with the spherical portion of the bulb;

On the right side of Figure 11, $e'$ is the angular spread, from the nadir, of a transparent portion of the bottom of the spherical portion of the bulb;

$f'$ is the angular spread, measured from the nadir, of the opaque specular reflective medium on the lower spherical portion of the bulb when $e'=0$; and in the angular position of the upper edge of such area when $e'$ is not equal to 0;

$f'-e'$ is the angular spread of the opaque specular reflective medium on the lower spherical portion of the bulb, when $e'$ is greater than 0, i. e. when a transparent portion of the lower spherical part of the bulb exists.

$i'$ is the angular spread of the opaque specular reflective medium on the conical portion of the bulb;

$g'$ is the angular spread of the opaque specular reflective medium on the upper spherical portion of the bulb;

$g'_3$ is an angular spread of the opaque specular reflective medium on the upper spherical portion of the bulb which is greater than 0 and less than $g'$;

$T'$ is the point of tangency of the conical portion with the spherical portion of the bulb; and further:

$r$ is the radius of the spherical portion of the bulb;

$k$ is the vertical distance of the light source from the center of the spherical portion of the bulb;

Angle $(a)$ is the angle at which any ray of light emerges from the bulb, called alpha;

$\theta$ is the angular position of any ray of light in the axial plane, before it undergoes reflection; or the angular direction of any bare-lamp ray, both measured counter clockwise from the nadir;

$s$ is the angle between the axis of the bulb and the sides of the conical portion of the bulb, measured from the nadir;

$n$ is the integer, designating a certain light-ray;

$m$ is the number of times a particular light-ray is reflected;

$R$ represents the reflection coefficient of the opaque specular reflective medium;

$dv$ represents any small, or differential, vertical angle formed by two planes intersecting along the axis of the bulb and in which the given mathematical equations are solved;

JJ represents a sectional plane taken in said differential vertical angle;

QH is a line drawn perpendicular to ray WZ, or $I_1(a)$;

V is the vertex of angle $s$, between the conical sides extended to intersect the axis;

$\phi$ represents the angle between line HW and the axis of the bulb;

H represents the center of the spherical portion of the bulb;

S represents the location of the center of the light source.

In planning practical street lighting systems utilizing our invention, it is only necessary to follow the procedure now given in our specifications. If we assume that substantially uniform horizontal illumination is the result desired and assuming, also the value of $M=6$, we may calculate and construct by means of the prototype curve-values given in Figure 7 an ideal prototype curve.

Having constructed such a prototype curve of light distribution, we now have a pattern to guide us in the design of the reflecting surface or surfaces, to be placed upon our electric light bulb and their magnitude and location, or placement. Since the light emanating from the usual forms of electric light bulbs, when in its natural state, as far as the shape of its curve of distribution is concerned, is very poorly adapted to the production of effective, practical illumination of almost any specific work space and especially for the ideal uniform horizontal illumination of the streets, boulevards, highways, and other thoroughfares, as well as airports and other large outdoor public spaces, where planned scientific illumination is desired, it is necessary to so alter and remold the natural tore, or solid of light emitted by the bare street lamp as shown in curve A Figure 10 as to reshape it into practical compliance with the shape indicated by the ideal prototype curve B in Figure 10.

Fortunately it is within the ability of practical illuminating engineers to accomplish this purpose providing a process is at hand, because the crude mass of light sent out by the usual form of electric light bulbs is a very plastic medium, each and every ray of it can, by such proper procedure, be easily bent by reflection and redirected into useful planes and the whole light-mass, molded into an ideal form for the solution of a given problem, such as planned scientific street lighting, providing a process and the means for the transformation of the natural non-useful light-mass from the bare electric light bulbs can be provided. It is with such a process and the concrete structure which will produce the resultant transformation in an effective, efficient and useful manner that our invention is concerned.

In Figure 10:

Curve A represents light-distribution from bare street-lighting lamp.

Curve B represents the shape of the light-distribution from prototype curve. (Not drawn to scale.)

Curve C represents light-distribution from a street-lighting unit constructed in accordance with our process.

Curve D represents light-distribution from a street-lighting unit equipped with prismatic reflector.

We may now proceed with the transformation of the bare-lamp curve into the prototype by determining the additive and subtractive values of candlepower at all angles to reshape it for practical use.

$Ob$ from curve $A$ (Figure 10) = bare lamp $cp$. directed at angle $a$.

$Oc$ from curve $B$ (Figure 10) = required prototype $cp$. at angle $a$.

$bc$ (Figure 10) = $cp$. required to be added to $Ob$ to produce $Oc$.

Since $Oc = Ob + bc$

Therefore $bc = Oc - Ob = cp$. required to be added to $Ob$ to produce $Oc$, use can be made directly of the values in Figure 7.

By repeating the above process for each 10 degrees, starting with 5° from the nadir, the required additive and subtractive candlepower needed at each angle can be ascertained.

Assuming that the candlepower value at the center of each 10 degree zone represents its average candlepower, the flux of light required to be added to each zone can be calculated by the aid of the following tables which gives the factors by which these candlepower values should be multiplied to give the zonal lumens or the lumens required in each 10 degree zone.

These factors are the equivalents of the actual square feet in these zones on a sphere of one-foot radius.

*Multiplying factors to obtain zone lumens from average zone candlepower*

| Zone | | Multiplying factor |
|---|---|---|
| 0 to 10° | 170 to 180° | 0.095 |
| 10 to 20° | 160 to 170° | 0.283 |
| 20 to 30° | 150 to 160° | 0.483 |
| 30 to 40° | 140 to 150° | 0.628 |
| 40 to 50° | 130 to 140° | 0.774 |
| 50 to 60° | 120 to 130° | 0.897 |
| 60 to 70° | 110 to 120° | 0.992 |
| 70 to 80° | 100 to 110° | 1.058 |
| 80 to 90° | 90 to 100° | 1.091 |

When extreme accuracy, or accuracy greater than that given by the above choice of 10 degree zones and their constants is desired, zonal angles of any desired magnitude may be chosen and in like manner their constants determined and used.

The 10 degree zone chosen herein is the one made use of in all practical work of this character in illuminating engineering.

To use these factors with the curve of any lighting unit, the candlepower at 5 degrees is multiplied by the 0 to 10 degrees factor to obtain lumens in the 0 to 10 degrees zone; the candlepower at 15 degrees is multiplied by the 10 to 20 degree zone factor to obtain the lumens in the 10 to 20 degree zone, etc. The zonal lumens for any large zone is the sum of the lumens thus determined in all of the 10 degree sections of the zone.

Having thus determined the deficiencies and excesses of the bare-lamp distribution in both candle-power and in zonal lumens, as above outlined, their control by opaque specular reflecting areas on such portions of the surface of the bulb as will intercept some of or all the rays of light in directions in which the bare-lamp light-distribution curve exceeds the prototype light-distribution curve, will so redirect said light by one or more reflections that said light emerges from the bulb in directions in which the prototype light-distribution curve exceeds the bare-lamp distribution curve, thus supplying substantially all of the candle-power and lumen deficiencies of the bare-lamp. The following mathematical equations express the relations between the said bare-lamp and prototype light intensities and the lamp parameters and constants, for any differential vertical angle formed by two planes intersecting along the axis of the bulb; and when these equations are solved for the particular conditions, the ideal to be attained is established.
$I_p(a) = I_0(a) + I_1(a) + I_2(a) + I_3(a) + \ldots + I_n(a)$, where $I_0(a) = I_L(\theta)$ for those values of angle $(a)$ at which light from the source emerges from the bulb without impinging upon the opaque specular reflective medium, and $I_0(a) = 0$ for those values of angle $(a)$ at which light from the source does impinge upon the opaque specular reflective medium, and where $$I_1(a) = R \, I_L(\theta) \frac{\sin \theta}{\sin a} \frac{d\theta}{da}$$

for values of angle $(a)$ greater than $$120° - \tan^{-1} \frac{\sqrt{3}}{1 + \frac{2k}{r}} \qquad (1a)$$

and less than $$120° + 2g - \tan^{-1} \frac{\sin(60° + g)}{\cos(60° + g) + \frac{k}{r}} \qquad (1b)$$

and also less than $$\tfrac{1}{2}\left(\sin^{-1} \frac{-k \sin \theta}{r} + \theta - 60° - g'\right) \qquad (1c)$$

and $I_1(a) = 0$ for all other values of angle $(a)$ and wherein angles $a$ and $\theta$ are related by the equation $$(1) \quad a = \theta + 2 \sin^{-1} \frac{-k \sin \theta}{r} - 180°$$

with $\theta$ greater than 180° but less than 360°; and where $$I_2(a) = R \, I_L(\theta) \frac{\sin \theta}{\sin a} \frac{d\theta}{da}$$

for all values of angle $(a)$ greater than $$120° - \tan^{-1} \frac{\sqrt{3}}{1 - \frac{2k}{r}}$$

and less than $$120° - \tan^{-1} \frac{\sqrt{3} + \sin g'}{1 + \cos g' + \frac{k}{r}}$$

and also less than $$60° + \tan^{-1} \frac{\sqrt{\tfrac{3}{2}} \frac{k}{r} + \tan i}{1 - \frac{k}{2r}}$$

and $I_2(a) = 0$ for all other values of angle $(a)$ and wherein angles $(a)$ and $\theta$ are related by the equation $$(2) \quad a = 300° - \theta$$

with $\theta$ greater than 180° and less than 360°; and where $$I_3(a) = R^2 \, I_L(\theta) \frac{\sin \theta}{\sin a} \frac{d\theta}{da}$$

for all values of angle $(a)$ which result from the equations $$(3) \quad a = 60° - \tan^{-1} \frac{\sqrt{3} + \sin g_3}{1 + \frac{k}{r} + \cos g_3} + 2g_3$$

$$(4) \quad a = 30° + \tfrac{1}{2}(g_3 + f_3)$$

when the parametric angle $g_3$ is greater than zero and less than $g$ and the parametric angle $f'_3$ is either greater than $-e$ and less than $e'$ or else greater than $f'$ and less than $(120° - g')$ and $I_3(a) = 0$ for all other values of angle $(a)$ and where angles $(a)$ and $\theta$ are related by the parametric equations $$(5) \quad \theta = 180° - \tan^{-1} \frac{\sqrt{3} + \sin g_3}{1 + \frac{k}{r} + \cos g_3}$$

$$(6) \quad a = 60° - \tan^{-1} \frac{\sqrt{3} + \sin g_3}{1 + \frac{k}{r} + \cos g_3} + 2g_3$$

with $\theta$ greater than 0° and less than 180°.

A higher degree of accuracy or close approximation to the prototype, if desired, can be obtained by means of this disclosure for any number of values of light intensities at all selected angles; and in all differential vertical angles. We will now work out a typical application to candle-power intensities to exemplify the action of the reflecting areas.

Suppose a beam leaves a light source in a sphere at angle $\theta$ with the vertical, having an intensity $I(\theta)$. This light has symmetry about a vertical axis. Its solid angle can therefore be taken as a zone. Let $d\theta$ be the angle subtended by the zone, then its solid angle is $$\frac{2 \times 3.1416 \, r \sin \theta \, d\theta}{r} = 2 \times 3.1416 \sin \theta \, d\theta$$

Suppose that by reflection, or reflections, from the spherical surface this beam is changed to have angle $(a)$ with the vertical. Its spread, $da$, may be different now. Anyway, the solid angle subtended at the apparent source is $$\frac{2 \times 3.1416 \, r \sin a \, da}{r} = 2 \times 3.1416 \sin a \, da,$$

thus the beam started off with an intensity $I_1(\theta)$ in a solid angle $$\frac{2 \times 3.1416 \, r \sin \theta \, d\theta}{r} = 2 \times 3.1416 \sin \theta \, d\theta$$

After reflection it is confined to a solid angle $$\frac{2 \times 3.1416 \, r \sin a \, da}{r} = 2 \times 3.1416 \sin a \, da.$$

Its intensity is now $$I_1(\theta) \frac{\sin \theta \, d\theta}{\sin a \, da} = I_1(\theta) \frac{d \cos \theta}{d \cos a}$$

If the solid angle $a \times 3.1416 \sin a \, da$ is larger than $2 \times 3.1416 \sin \theta \, d\theta$, the intensity is reduced by the factor $$\frac{\sin \theta \, d\theta}{\sin a \, da}.$$

This is what the foregoing expression says.

When a beam is reflected by a plane or conical surface, $$d\theta = da, \text{ so } \frac{d\theta}{da} = 1.$$

Here $d\theta = da$, but $\theta$ does not equal angle $(a)$, therefore $\sin a$ does not equal $\sin \theta$. Here $\sin a$ is greater than $\sin \theta$, so the beam has small intensity after reflection, in the ratio $$\frac{\sin \theta}{\sin a}$$

When a beam is reflected by a spherical surface, $d\theta$ does not equal $da$, so $$\frac{d\theta}{da}$$

does not equal 1.

Where $\sin a$ is greater than $\sin \theta$, and $da$ is greater than $d\theta$, $$\frac{\sin \theta \, d\theta}{\sin a \, da}$$

is less than 1, and the beam is reduced in intensity by reflection.

We have treated the source of light as a point source only. Any actual filament will have a "center of brightness" at some point, equivalent to a point source. The chief practical difference between the actions of a point source and an actual source is that the limiting edges of beams of light will not be sharp in the latter case—they will be rounded off; and this is a good thing.

We consider the source at a vertical distance $k$ from the center of the spherical portion of the bulb. This distance $k$ is one of the lamp parameters. The others are listed and defined above.

For the purposes of illustration, we will now proceed to show how the values of the various intensities in any direction were obtained. The bare lamp curve is changed by reflections at the opaque specular reflective surfaces. At any angle $(a)$ the intensity will be that of the bare lamp plus the gains brought about by reflections—single reflections, double reflections, and others. We have treated each gain separately, and have labeled them $I_1(a)$, $I_2(a)$, $I_3(a)$, ... $I_n(a)$ $I_1(a)$ is the gain at angle $(a)$ due to a ray which undergoes a single reflection from the spherical reflecting area $g$ as shown in Figure 11. Angle $g$ denotes angular spread of the spherical area that is coated on the axial plane selected. Angle $g$ is the quantity that limits angle $(a)$, and the range of $I_1(a)$; if angle $g$ is made greater, the range of $I_1(a)$ is increased. Thus, in Figure 11, if angle $g$ is increased so that the reflected ray strikes the bottom edge of the opaque specular reflective medium $g'$, on the opposite side of the spherical portion of the bulb, any further increase in angle $g$ decreases the range of $I_1(a)$. The other limit of the range is fixed by the point of tangency of sphere and cone T or T'.

It will be readily seen from the above discussion that if the angular spread of the opaque specular reflective medium be extended to the same limiting points on the right hand side of the axis of the bulb as on the left hand side, i. e., if the values of $e, f, g$, and $i$ are identical with $e', f', g'$, and $i'$, and all axial planes, then the lamp will give a light-distribution which is symmetrical around the central axis VH of the lamp and the lamp, when lighted, will produce symmetrical, uniform, horizontal, street illumination. For such a lamp, therefore, the zonal areas of the opaque specular reflective medium required for such symmetrical light-distribution will conform to the values obtained by the solution of the equations for only a single value of each of the quantities $e, f, g$, and $i$.

We have derived a mathematical relation for $I_1(a)$, to express its intensity at any angle $(a)$.

Likewise we have treated $I_2(a), I_3(a), \ldots I_n(a)$, so that their intensities and ranges will be functions of the lamp parameters $k, r, s$, angle $e$, angle $f$, angle $g$, angle $i$, and their primes, and so on. By changing $e, f, g, i$, and so on, we can change the intensity in any direction, i. e., by arranging the limits of the areas of specular reflective medium we can change the intensity in any direction, thus approximating the prototype curve for uniform horizontal street lighting.

To determine the intensity in any direction the combination of the lamp parameters, constants and variables, are determined, which will, when found by solving their mathematical relations, give the $I(a)$ values whose summation will approximate the $I_p(a)$ values of the prototype light-distribution curve.

The bare lamp has a certain intensity curve. We may denote the intensity of its light ray at any angle $\theta$ by $I_L(\theta)$. $\theta$ is reckoned from a downward vertical line, or nadir, and counter clockwise.

$I_1(a), I_2(a), \ldots I_n(a)$ will be written in terms of $I_L(\theta)$. $\theta$ is the angle that the original bare-lamp ray makes with the vertical, or nadir, before reflection but after reflection (or reflections) it makes angle $(a)$ with the nadir.

We determine an expression for $\theta$ in terms of angle $(a)$ in every case. Then for a given angle $(a)$, $\theta$ is found, and $I_L(\theta)$ can be read from the bare lamp curve. Also $$\frac{\sin \theta \, d\theta}{\sin a \, da} \text{ or } \frac{d \cos \theta}{d \cos a}$$

can be calculated. In this way $$R^m I_L(\theta) \frac{\sin \theta \, d\theta}{\sin a \, da}$$

can be calculated, and this is the gain in the direction of angle $(a)$ for this particular reflection (or multiple reflections).

The summation of bare lamp candle-power at angle $(a)$ and the gains in candle-power at angle $(a)$ brought about by the intensities $I_1(a), I_2(a), I_3(a), \ldots I_n(a)$ produces the approximation to the prototype intensity $I_P(a)$ at angle $(a)$. Therefore $$I_P(a) = I_0(a) + I_1(a) + I_2(a) + I_3(a) \ldots I_n(a)$$

The following is the investigation and determination of $I_1(a)$. $I_1(a)$ is the gain in intensity at angle $(a)$ caused by one reflection from the upper spherical portion $g$ of the bulb, Figure 11.

As shown in said Figure 11, $$HS = k$$

$$\sin \text{ angle } YSH = \sin (\theta - 180°) = -\sin \theta$$

$$\cos \text{ angle } YSH = \cos (\theta - 180°) = -\cos \theta$$

$$HY = -k \sin \theta \quad YS = -k \cos \theta$$

$$\sin \text{ angle } YWH = \frac{YH}{HW} = \frac{-k \sin \theta}{r}$$

$$\text{angle } HWZ = \text{angle } YWH = +\sin^{-1} \frac{-k \sin \theta}{r}$$

$$a = \theta + 2 \text{ angle } HWZ - 180°$$

(1) $\quad a = \theta + 2 \sin^{-1} \frac{-k \sin \theta}{r} - 180°$ ($a$ in terms of $\theta$)

Angle $a$ is a minimum when the ray $I_L(\theta)$ strikes the point of tangency T Then $$\phi = 60°$$

and $$\theta - 180° = \tan^{-1} \frac{\frac{\sqrt{3}}{2}}{\frac{1}{2} - \frac{k}{r}} = \tan^{-1} \frac{\sqrt{3}}{1 + \frac{2k}{r}}$$

and $$a = 2 \times 60° - \tan^{-1} \frac{\sqrt{3}}{1 - \frac{2k}{r}} = 120° - \tan^{-1} \frac{\sqrt{3}}{1 + \frac{2k}{r}}$$

(1a)

Angle $a$ is maximum when the ray $I_L(\theta)$ strikes the bottom of $g$.

Then $$\phi = 60° + g$$

and $$\theta - 180° = \tan^{-1} \frac{\sin\left(\frac{180°}{3} + g\right)}{\cos\left(\frac{180°}{3} + g\right) + \frac{k}{r}} = \tan^{-1} \frac{\sin(60° + g)}{\cos(60° + g) + \frac{k}{r}}$$

and $$a = 120° + 2g - \tan^{-1} \frac{\sin\left(\frac{180°}{3} + g\right)}{\cos\left(\frac{180°}{3} + g\right) + \frac{k}{r}}$$

$$= 120° + 2g - \tan^{-1} \frac{\sqrt{3} \cos g + \sin g}{\cos g - \sqrt{3} \sin g + \frac{2k}{r}}$$

(1b) $\quad a = 120° + 2g - \tan^{-1} \frac{\sin(60° + g)}{\cos(60° + g) + \frac{k}{r}}$ The maximum value of angle $(a)$ may also be limited by the angle $g'$, i. e., the coating on right hand side.

Suppose the point of impingence W of the ray is not at the bottom of the angle $g$ on the left side, but, that point Z of emergence of $I_1(a)$ from the bulb is at the bottom of angle $g'$ on the right side. That is, angle $g$ may be coated below point W so that this point W is not the limiting factor; rather, the point Z of emergence determines the maximum value of angle $(a)$. If angle $(a)$ were any greater the ray would strike the coating on angle $g'$. The relations are then $\phi =$ angle $WHV =$ angle $WHY+$angle $WSH =$
$$\sin^{-1}\frac{-k\sin\theta}{r}+(\theta-180°)$$

angle $VHQ = \frac{180°}{2}-a$ angle $QHZ = WHQ =$ angle $WHV+$
angle $VHQ = \sin^{-1}\frac{-k\sin\theta}{r}+\theta-180°+$
$$\frac{180°}{2}-a$$

angle $VHZ =$ angle $VHQ +$ angle $QHZ =$
$$\left(\frac{180°}{2}-a\right)+\left(\sin^{-1}\frac{-k\sin\theta}{r}+\theta-\frac{180°}{2}+180°-a\right)=\sin^{-1}\frac{-k\sin\theta}{r}+\theta-2a$$

also when Z coincides with lower limit of $g'$, angle $VHZ = 60° - g'$ therefore $$60°+g'=\sin^{-1}\frac{-k\sin\theta}{r}+\theta-2a$$

(1c) $a=\tfrac{1}{2}(\theta-60°-g'+\sin^{-1}-k\sin\theta)$

This is the maximum value of angle ($a$) when the ray is cut off by $g'$.

In other words $I_1(a)$ lies say between two values of angle ($a$). One limit is fixed by the point of tangency T of sphere and cone. The other limit depends on angle $g$, so by varying $g$ the range of $I_1(a)$ can be varied. Angle $g$ denotes the angular spread of the upper spherical coated area. If $g$ is increased the latter limit is increased, unless the ray SWZ strikes the bottom of the zone at $g'$. When this happens, any further increase in $g$ decreases the range of $I_1(a)$ in this direction, because these rays are then reflected in other directions.

These three limiting equations just found for determining the angular spread of the opaque specular reflective medium on the upper spherical portion of the bulb have already been cited herein. If now we select angle ($a$), angle $\theta$ now can be found. Then $I_L(\theta)$ can be read from the bare lamp light-distribution curve and $$\frac{\sin\theta}{\sin a}$$

can be found. Now we get $$\frac{(d\theta)}{da}=1-\frac{2k}{r}\cos a \text{ and } \frac{\sin\theta}{\sin a}=\frac{\sin\left(-\frac{2k}{r}\sin a\right)}{\sin a}$$

In practice, $$\frac{k}{r}$$

is small, so $$\frac{k}{r}$$

can be neglected in comparison with 1. With this approximation, $$\sin^{-1}\frac{k}{r}=\frac{k}{r}$$

(when the angle is measured in radians). Then $$\theta=180°-a+\frac{2k}{r}\sin a$$

$$\left(\frac{d\theta}{da}\right)=1-\frac{2k}{r}\cos a$$

$$I_1(a)=R\,I_L(\theta)\frac{\sin\theta}{\sin a}\frac{d\theta}{da}$$

$$=R\,I_L(\theta)\frac{\sin\left(a-\frac{2k}{r}\sin a\right)}{\sin a}\left(1-\frac{2k}{r}\cos a\right)$$

$$=R\,I_L(\theta)\left(1-\frac{2k}{r}\cos a\right)^2$$

We can now solve this equation for $I_1(a)$, which can be done, since they are expressive of the light intensity due to the location of the opaque specular reflective medium on the bulb surface, and all the quantities on the right hand side being known. The values of $g$ and $g'$, which depend on the angular areas on the upper spherical surface of the bulb are found from the equations above cited.

$I_2(a)$ is the gain in intensity at angle ($a$) caused by one reflection from the cone.

The minimum limiting value of angle ($a$) for $I_2(a)$ ray occurs when the $I_L(\theta)$ ray strikes the point of tangency T and this value becomes $$120°-\tan^{-1}\frac{\sqrt{3}}{1-\frac{2k}{r}}$$

We also find that the upper limiting, or maximum, value of angle ($a$) for $I_2(a)$ ray when it strikes the bottom of the opaque specular reflective medium on the emergence side is $$a=120°-\tan^{-1}\frac{\sqrt{3}+\sin g'}{1+\cos g'+\frac{k}{r}}$$

and that for the limiting value of angle ($a$) when the $I_2(\theta)$ ray strikes higher than the upper edge of the cone, $$a=60°+\tan^{-1}\frac{\frac{\sqrt{3}}{2}\frac{k}{r}+\tan i}{1-\frac{k}{2r}}$$

and $$a=2\times 180°-\theta-\frac{180°}{3}$$
$$a=300°-\theta$$
$$\theta=300°-a$$

For $I_2(a)$ these relations exist:

$$\tan\left(\frac{4}{3}\times 180° - \theta\right) = \frac{\tan i + \frac{k}{r}\sin\frac{180°}{3}}{1+\frac{k}{r}\cos\frac{180°}{3}}$$

$$\theta = \frac{4}{3}\times 180° - \tan^{-1}\frac{\tan i + \frac{\sqrt{3}}{2}\frac{k}{r}}{1+\frac{k}{2r}}$$

$$\theta = 240° - \tan^{-1}\frac{\tan i + \frac{\sqrt{3}}{2}\frac{k}{r}}{1+\frac{k}{2r}}$$

$$\therefore\ a = 300° - \left(240° - \tan^{-1}\frac{\tan i + \frac{\sqrt{3}}{2}\frac{k}{r}}{1+\frac{k}{2r}}\right)$$

$$a = 60° + \tan^{-1}\frac{\tan i + \frac{\sqrt{3}}{2}\frac{k}{r}}{1+\frac{k}{2r}} \text{ as above.}$$

$\sin a = \sin 300° \cos\theta - \cos 300° \sin\theta$ $\sin a = -\frac{\sqrt{3}}{2}\cos\theta + \frac{1}{2}\sin\theta = \frac{1}{2}(\sin\theta - \sqrt{3}\cos\theta)$ Also $d\theta = da$ $\therefore\ \frac{\sin\theta\, d\theta}{\sin a\, da} = \frac{1}{2}(1-\sqrt{3}\cot a)$ $I_2(a) = R\, I_L(\theta)\times \frac{1}{2}(1-\sqrt{3}\cot a)$ $= R\, I_L(300°-a)\times \frac{1}{2}(1-\sqrt{3}\cot a),$ which can now be solved.

In the foregoing discussion of $I_2(a)$ it was assumed that the opaque specular reflective medium is spread high enough so that the top of the medium on the cone is not the limiting factor, but that the bottom of the zone on the emergence side is the limiting factor. But if the cone is not coated sufficiently high, the cone itself provides the limit.

So, also, the rays may be traced and calculated which travel from the source to the conical surface, thence to the opposite conical surface, and thence emerge through the spherical portion of the bulb.

The simple way of handling reflections from a cone is to put a phantom source on the other side of the conical surface and imagine the rays, after reflection, to come from the phantom source.

Rays leave the source S at various angles, to be reflected at the conical surface. After reflection these rays are exactly as if they came from the image of S formed by the cone.

After the first reflection, the rays may strike the cone on the other side. After the second reflection, the rays act exactly as if they had come from a secondary image of the first, or primary, image of S.

Thus it is easy to trace the rays in an axial plane, when dealing with the reflections at the surface of the cone.

As is shown in Figure 11, by the ray marked $I_3(a')$, this ray may be prevented from emergence after the said second reflection by placing opaque specular reflective medium on the bottom of the spherical portion of the bulb as represented by $f'$, of Figure 11, and be again reflected to the cone for two more reflections before emergence in the direction $I_3(a')$. As this direction does not contribute to the rays at angle $(a)$ of our previous calculations, its effect will be only in relation to the prototype curve at the angle where it actually contributes.

By means of the equations and relations which have been developed and given above and other equations which have been or can be derived in a similar manner, the path of any ray in an axial section of the bulb may be found for any given distribution of reflective medium upon the bulb, in any axial plane, the final angle of emergence may be determined and the contribution to the total intensity in this direction, angle $(a)$, may be found by evaluating the expression:

$$I(a) = R^m I_L(\theta)\frac{\sin\theta\, d\theta}{\sin a\, da}$$

which has been illustrated above.

For any given distribution of reflective medium on this axial section of the bulb, certain groups of rays will suffer the same reflections in the same sequence. For any one of these groups of rays $I(a)$ will be a continuous function. The boundaries of this interval may be determined by substituting into the proper formulas, the angles, or lengths, giving the positions of the edges of the coated portions, which edges limit this particular group of rays.

For any given distribution of reflective medium it will usually be found that a certain few of these groups of rays are by far the most important and that if $I(a)$ is evaluated for these few groups then the light-distribution is determined closely enough for practical purposes. There are, of course, a great many different possible combinations of reflections for which $I(a)$ may be evaluated. Most of these, however, are not important enough to be considered in practical applications. Typical equations have been given for some of the important ones.

We have set forth what reflections and combination of reflections increase the intensity in different directions. We attain our objective by applying the reflective medium on the bulb to obtain as many of these desirable reflections as possible, and thereby to substantially approximate any desired intensity distribution, for uniform horizontal street illumination.

Having thus described our invention and illustrated its use, what we claim as new and desire to secure by Letters Patent is:

1. The process of changing an electric street lighting bulb to transform the bare lamp curve of distribution of light emitted by the bulb, when lighted, into an approximation of a prototype, symmetric light-distribution for symmetric, uniform horizontal street lighting, which comprises the application of an opaque, specular reflective medium upon certain areas of the surface of said bulb to so supplement the direct light with reflected light, that the light is distributed to give prototype, symmetric, uniform horizontal street lighting, the extent, location and configuration of said areas in their relation to the light source being in conformity with the laws of the transmission and reflection of light and which can be expressed in the relation:

$$I_p(a) = I_0(a) + I_1(a) + I_2(a) + I_3(a) + \ldots + I_n(a),$$

in which $I_0(a) = I_L(\theta)$ for those values of angle $(a)$ at which light from the source emerges from the bulbs without impinging upon the opaque specular reflective medium, and where $$I_1(a) = R\, I_L(\theta) \frac{\sin \theta}{\sin a} \frac{d\theta}{da}$$

for values of angle $(a)$ greater than $$120° - \tan^{-1} \frac{\sqrt{3}}{1 + \frac{2k}{r}}$$

and less than $$120° + 2g - \tan^{-1} \frac{\sin(60° + g)}{\cos(60° + g) + \frac{k}{r}}$$

and also less than $$\tfrac{1}{2}\left(\sin^{-1} \frac{-k \sin \theta}{r} + \theta - 60° - g'\right)$$

and $I_1(a) = 0$ for all other values of angle $(a)$ and wherein angles $a$ and $\theta$ are related by the equation $$a = \theta + 2 \sin^{-1} \frac{k \sin \theta}{r} - 180°$$

with $\theta$ greater than 180° but less than 360°; and where $$I_2(a) = R\, I_L(\theta) \frac{\sin \theta}{\sin a} \frac{d\theta}{da}$$

for all values of angle $(a)$ greater than $$120° - \tan^{-1} \frac{\sqrt{3}}{1 + \frac{2k}{r}}$$

and less than $$120° - \tan^{-1} \frac{\sqrt{3} + \sin g'}{1 + \cos g' + \frac{k}{r}}$$

and also less than $$60° + \tan^{-1} \frac{\frac{\sqrt{3}}{2} \frac{k}{r} + \tan i}{1 + \frac{k}{2r}}$$

and $I_2(a) = 0$ for all other values of angle $(a)$ and wherein angles $(a)$ and $\theta$ are related by the equation $$a = 300° - \theta$$

with $\theta$ greater than 180° and less than 360°; and where $$I_3(a) = R^2 I_L(\theta) \frac{\sin \theta}{\sin a} \frac{d\theta}{da}$$

for all values of angle $(a)$ which result from the equations $$a = 60° - \tan^{-1} \frac{\sqrt{3} + \sin g_3}{1 + \frac{k}{r} + \cos g_3} + 2g_3$$

$$a = 30° - \tfrac{1}{2}(g_3 - f_3)$$

when the parametric angle $g_3$ is greater than zero and less than $g$ and the parametric angle $f'_3$ is either greater than $-e$ and less than $e'$ or else greater than $f'$ and less than $(120° - g')$ and $I_3(a) = 0$ for all other values of angle $(a)$ and wherein angles $(a)$ and $\theta$ are related by the parametric equations $$\theta = 180° - \tan^{-1} \frac{\sqrt{3} + \sin g_3}{1 + \frac{k}{r} + \cos g_3}$$

$$a = 60° - \tan^{-1} \frac{\sqrt{3} + \sin g_3}{1 + \frac{k}{r} + \cos g_3} + 2g_3$$

with $\theta$ greater than 0° and less than 180°.

2. An electric street lighting bulb having a normal bare lamp curve of distribution of light emitted by the bulb when lighted, and means associated therewith for modifying the distribution, to change the bare lamp curve into an approximation of a prototype symmetric light-distribution for symmetric uniform horizontal street lighting, said means comprising an opaque, specular reflective medium upon areas of the surface of said bulb to so supplement the direct light with reflected light, that the light is distributed to give prototype symmetric uniform horizontal street lighting, the extent, location and configuration of said areas in their relation to the light source being in conformity with the laws of the transmission and reflection of light and which can be expressed in the relation:

$$I_p(a) = I_0(a) + I_1(a) + I_2(a) + I_3(a) + \ldots + I_n(a),$$

in which $I_0(a) = I_L(\theta)$ for those values of angle $(a)$ at which light from the source emerges from the bulbs without impinging upon the opaque specular reflective medium, and where $$I_1(a) = R\, I_L(\theta) \frac{\sin \theta\, d\theta}{\sin a\, da}$$

for values of angle $(a)$ greater than $$120° - \tan^{-1} \frac{\sqrt{3}}{1 + \frac{2k}{r}}$$

and less than $$120° + 2g - \tan^{-1} \frac{(\sin 60° + g)}{\cos (60° + g) + \frac{k}{r}}$$

and also less than $$\tfrac{1}{2}\left(\frac{\sin^{-1} - k \sin \theta}{r} + \theta - 60° - g'\right)$$

and $I_1(a) = 0$ for all other values of angle $(a)$ and wherein angles $a$ and $\theta$ are related by the equation $$a = \theta + 2 \sin^{-1} \frac{-k \sin \theta}{r} - 180°$$

with $\theta$ greater than 180° but less than 360°; and where $$I_2(a) = R\, I_L(\theta) \frac{\sin \theta\, d\theta}{\sin a\, da}$$

for all values of angle $(a)$ greater than $$120° - \tan^{-1} \frac{\sqrt{3}}{1 + \frac{2k}{r}}$$

and less than $$120° - \tan^{-1} \frac{\sqrt{3} + \sin g'}{1 + \cos g' + \frac{k}{r}}$$

and also less than $$60° + \tan^{-1} \frac{\sqrt{\frac{3}{2}} \frac{k}{r} + \tan i}{1 + \frac{k}{2r}}$$

and $I_2(a) = 0$ for all other values of angle $(a)$ and wherein angles $(a)$ and $\theta$ are related by the equation $$a = 300° - \theta$$

with $\theta$ greater than 180° and less than 360°; and where $$I_3(a) = R^2\, I_L(\theta) \frac{\sin \theta\, d\theta}{\sin a\, da}$$

for all values of angle $(a)$ which result from the equations $$a = 60° - \tan^{-1} \frac{\sqrt{3} + \sin g_3}{1 + \frac{k}{r} + \cos g_3} + 2g_3$$

$$a = 30° - \tfrac{1}{2}(g_3 - f_3)$$

when the parametric angle $g_3$ is greater than zero and less than $g$ and the parametric angle $f'_3$ is either greater than $-e$ and less than $e'$ or else greater than $f'$ and less than $(120° - g')$ and $I_3(a) = 0$ for all other values of angle $(a)$ and wherein angles $(a)$ and $\theta$ are related by the parametric equations $$\theta = 180° - \tan^{-1} \frac{\sqrt{3} + \sin g_3}{1 + \frac{k}{r} + \cos g_3}$$

$$a = 60° - \tan^{-1} \frac{\sqrt{3} + \sin g_3}{1 + \frac{k}{r} + \cos g_3} + 2g_3$$

with $\theta$ greater than 0° and less than 180°.

3. An electric bulb to serve as a unit in a street lighting system and in which a plurality of units are to be mounted in spaced relation both with reference to each other and with reference to the street to be illuminated, said bulb having a filament which is relatively condensed about its focal point and having a normal bare lamp light distribution, and means associated therewith for modifying the distribution to change the bare lamp curve into an approximation of a prototype distribution of light flux, said means comprising an opaque specular reflective medium upon an area thereof curved vertically and positioned in such opposition to said focal point so as to reflect the light therefrom to below the horizontal and upon an area to one side of and of a different character from, said first mentioned reflecting area, for reflecting light from the filament upon said first mentioned area, said reflecting areas serving to so supplement the direct light with reflected light, that the light is distributed to give an approximation to a prototype street lighting distribution, the extent, location and configuration of said areas in their relation to the light source being dependent upon and varying with the ratio of the distance between the units, to their elevation, and being such as to give for each unit the prototype light distribution called for by the particular ratio.

In witness whereof we have hereunto signed our names.

MORRIS B. BECK.
JOHN D. WHITTAKER.